United States Patent
Hoshino

[11] Patent Number: 5,888,139
[45] Date of Patent: Mar. 30, 1999

[54] ELASTIC SHAFT COUPLING APPARATUS

[75] Inventor: Kenji Hoshino, Gunma-ken, Japan

[73] Assignee: Kabushiki Kaisha Yamada Seisakusho, Gunma-ken, Japan

[21] Appl. No.: 840,147

[22] Filed: Apr. 11, 1997

[30] Foreign Application Priority Data

Apr. 11, 1996 [JP] Japan .................................. 8-089720

[51] Int. Cl.⁶ .................................................. F16D 3/78
[52] U.S. Cl. ............................................ 464/98; 464/134
[58] Field of Search .............................. 464/87, 51, 93, 464/98, 137, 147

[56] References Cited

U.S. PATENT DOCUMENTS

| | | | |
|---|---|---|---|
| 2,385,369 | 9/1945 | Niekamp | 464/93 |
| 2,877,633 | 3/1959 | Hagenlocher | 464/98 |
| 3,478,539 | 11/1969 | Daur | 464/93 |
| 4,702,722 | 10/1987 | Naue et al. | 464/93 |

FOREIGN PATENT DOCUMENTS

| | | | |
|---|---|---|---|
| 194184 | 9/1986 | European Pat. Off. | 464/93 |
| 4-75405 | 11/1992 | Japan . | |
| 306980 | 2/1929 | United Kingdom | 464/93 |
| 1159750 | 7/1969 | United Kingdom | 464/93 |
| 2164122 | 3/1986 | United Kingdom | 464/93 |

*Primary Examiner*—Eileen Dunn Lillis
*Attorney, Agent, or Firm*—Lowe Hauptman Gopstein Gilman & Berner

[57] ABSTRACT

An elastic plate member is clamped between an input-side stopper plate and an output-side stopper plate, and the input-side stopper plate is secured to an input-side member, and the output-side stopper plate to an output-side member at appropriate intervals therebetween, respectively, in a state in which tubular members and collar members into which the tubular members are respectively inserted are interposed therebetween. The input-side member and the output-side member are elastically coupled in the axial direction and in the circumferential direction of the input- and output-side members. A tilting-restriction shaft is formed on either the input-side or output-side stopper plate. A tilting-restriction member having a tilting-restriction hole is fixed between the stopper plate provided with the tilting-restriction shaft and the input-side member or the output-side member facing the side of the stopper plate provided with the tilting-restriction shaft, and the tilting-restriction shaft is accommodated in the tilting-restriction hole.

5 Claims, 14 Drawing Sheets

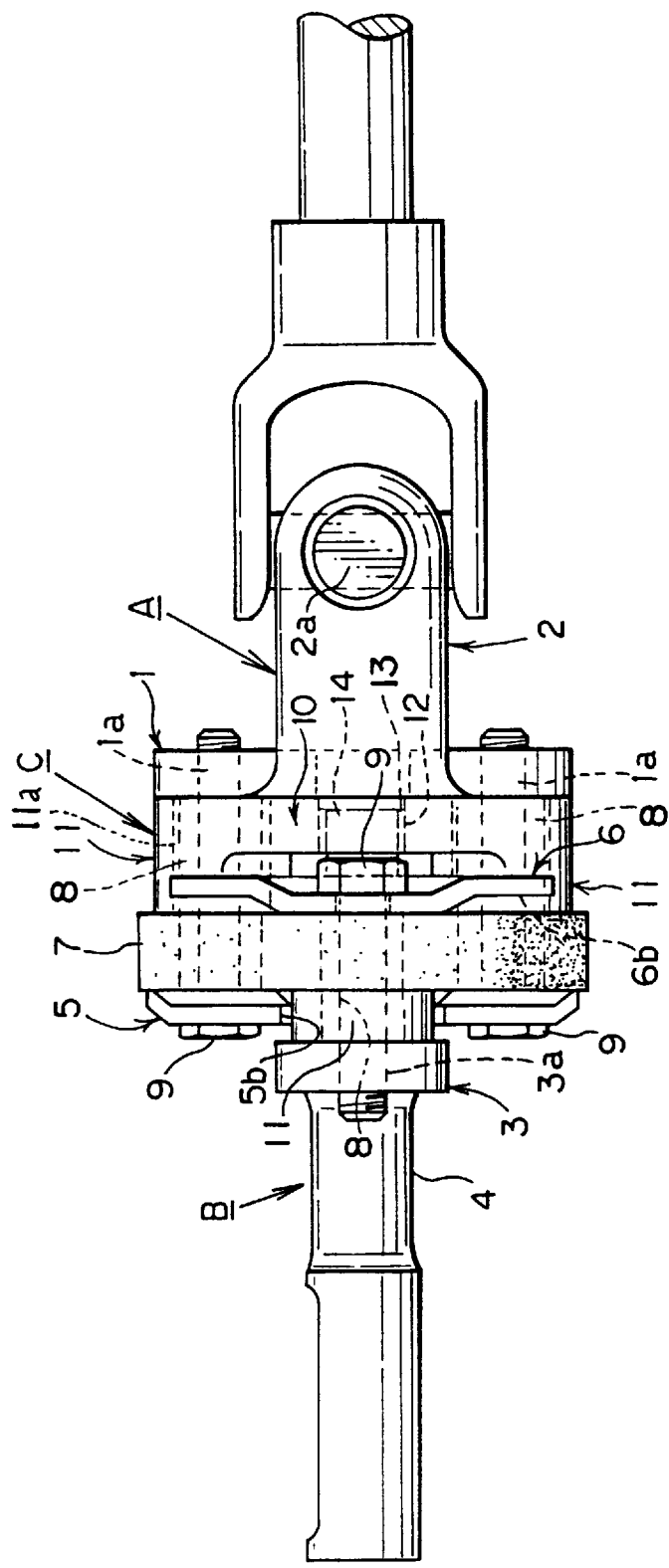

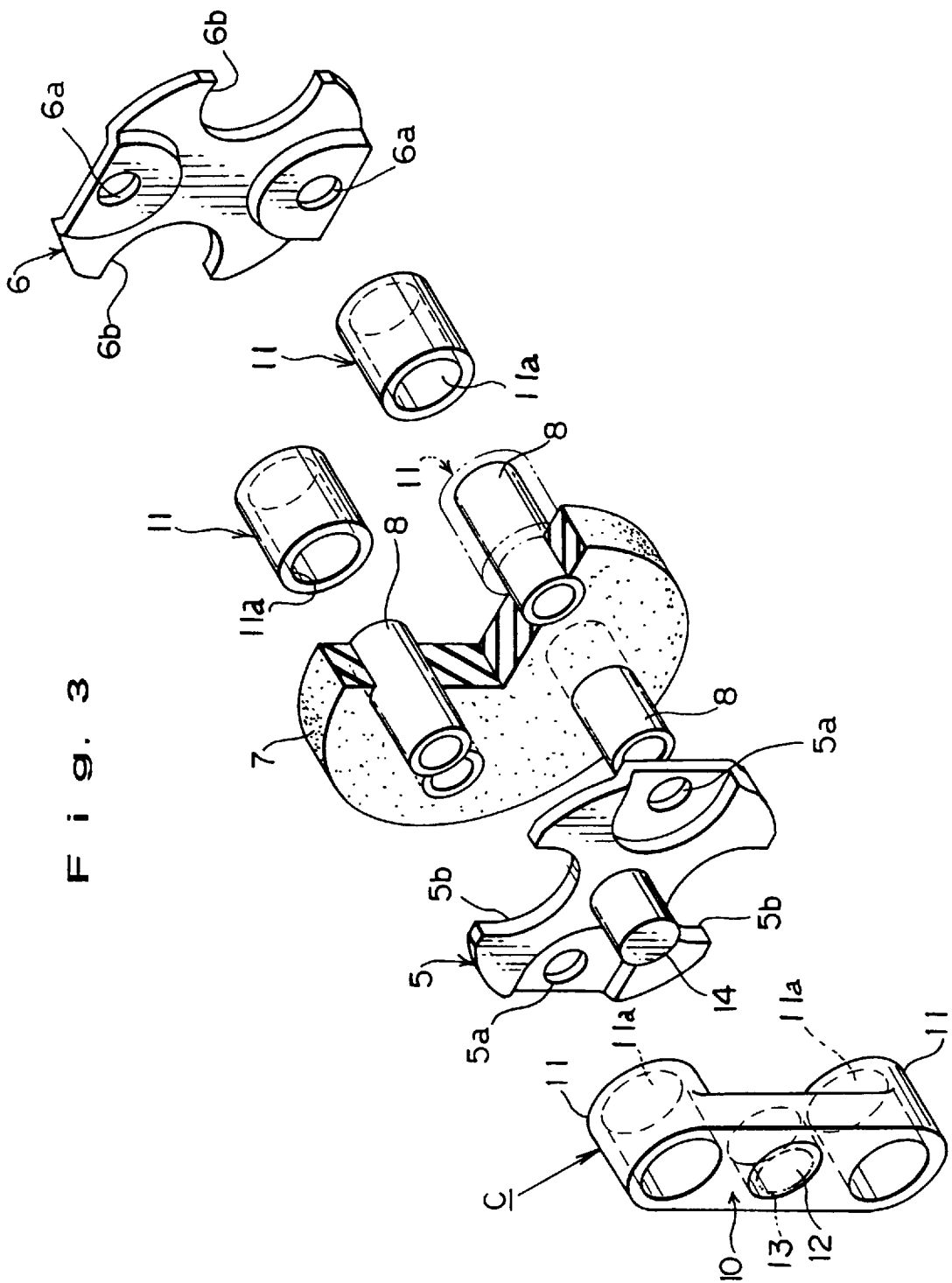

ELASTIC SHAFT COUPLING APPARATUS

BACKGROUND OF THE INVENTION

1. Field of the Invention

The present invention relates to an elastic shaft coupling apparatus which is capable of elastically transmitting a rotating force from an input-side member to an output-side member.

2. Description of the Related Art

In a conventional steering system, an elastic shaft coupling apparatus has a mechanism for prevention of tilting of an input shaft and an output shaft of the elastic shaft coupling apparatus is disclosed in Japanese Patent Application Publication No. 75405/1992. To summarize the structure of the just-mentioned elastic shaft coupling apparatus, as shown in FIG. 16, a pair of stopper plates s are respectively disposed on both sides of an elastic plate member e in such a manner as to face axial end sides of an input shaft c and an output shaft d.

The stopper plate s and the input shaft c on one side, and the stopper plate s and the output shaft d on the other side, are pin coupled together by means of bolts, thereby coupling the input shaft c and the output shaft d with the elastic plate member e clamped therebetween.

In this elastic shaft coupling structure, appropriate gaps are respectively provided between the respective stopper plates s and the end faces of the input shaft c and the output shaft d corresponding thereto. The input shaft c and the output shaft d are adapted to be rotatable relative to each other at an arbitrary rotating angle by virtue of deflection of the elastic plate member e. Further, a support shaft a projects from a center of either one of the stopper plates s. A receiving hole b for receiving the support shaft a is formed in an end face portion of the input shaft c or the output shaft d opposing that stopper plate s, and the support shaft a is inserted and disposed in the receiving hole b with an elastic material f disposed in the receiving hole b to surround the support shaft a.

If the above-described structure is adopted, drawbacks can occur such as that, due to an error in the assembly of the support shaft a of the stopper plate S and the input shaft c or the output shaft d, their axes become offset, and poor positional accuracy of the support shaft a of the stopper plate s results in misalignment between the axes of the support shaft a and the input shaft c or the output shaft d.

In such a case, in an inserting and coupling section formed by the support shaft a of the stopper plate s, which is fixed to either the input shaft c or the output shaft d, and the receiving hole b for receiving the support shaft a, the support shaft a of the stopper plate s is forcibly inserted in the receiving hole b due to the offset of the axes. As a result, the support shaft a of the stopper plate s and the receiving hole b are set in a mutually offset state, so that the support shaft a is set in a state of uneven contact with the elastic material f provided between the support shaft a and the inner peripheries of the receiving hole b.

Consequently, there occurs an increase in axial sliding resistance between the outer peripheral surface of the support shaft a of the stopper plate s and the elastic material f in the receiving hole b, which makes it impossible for the elastic plate member e to undergo smooth deflection in its axial direction. This also leads to the possibility of degrading the function of transmitting vibrations from the steering gear side to the steering shaft side while dampening the vibrations by means of the axial deflection of the elastic plate member e. Further, there is a possibility that variations in the amount of axial deflection of the elastic plate member e becomes large, causing variations in the spring constant in individual elastic shaft coupling apparatus and leading to instability in performance.

If a desired elastic shaft coupling apparatus is to be obtained which is capable of more substantially dampening the vibrations transmitted from the steering gear side to the steering shaft side, the above-described drawbacks necessitates the provision of a structure which increases the spring constant of the elastic plate member e (i.e., makes deflection difficult to occur) in the direction of relative rotation of the input shaft c and the output shaft d, and lowers the spring constant in the axial direction, thereby facilitating relative movement of the input shaft c and the output shaft d in the axial direction and stabilizing their movement in the axial direction.

In addition, to realize such a structure, it is conceivably necessary to enhance parts processing accuracy or assembling accuracy, or enlarge the clearance between the outer periphery of the support shaft a of the stopper plate S and the elastic material f accommodated in the receiving hole b, so as to expand an allowable range of movement. However, the former measure increases the product cost, and the latter measure has the possibility of making it impossible to sufficiently display the function for preventing the tilting of the input shaft c and the output shaft d in the elastic shaft coupling apparatus.

SUMMARY OF THE INVENTION

In view of the above-described circumstances, it is an object of the present invention to provide an elastic shaft coupling apparatus which is capable of elastically transmitting the rotating force between the input-side member and the output-side member, of improving the performance of isolating vibrations during the transmission, and of favorably coping with the tilting of the input-side member and the output-side member relative to each other in the axial direction, thereby overcoming the above-described drawbacks of the conventional art.

To this end, in accordance with a first aspect of the present invention, there is provided an elastic shaft coupling apparatus which comprises an input-side stopper plate; an output-side stopper plate; an elastic plate member clamped by the input-side stopper plate and the output-side stopper plate; tubular members; and collar members into which the tubular members are respectively inserted with clearances. An input-side member is secured to the input-side stopper plate at an appropriate interval therewith via the tubular members and the collar members. An output-side member is secured to the output-side stopper plate at an appropriate interval therewith via the tubular members and the collar members, and is elastically coupled to the input-side member in an axial direction and in a circumferential direction. A tilting-restricting shaft is formed on one of the input-side stopper plate and the output-side stopper plate. A tilting-restricting member is fixed between the elastic plate member and one of the input-side member and the output-side member, and has a tilting-restricting hole for accommodating the tilting-restricting shaft therein. Accordingly, it is possible to satisfactorily restrict the tilting of the input-side member and the output-side member in the elastic coupling of the steering system, which improves the operating efficiency in assembling the apparatus.

In accordance with a second aspect of the present invention, the elastic shaft coupling apparatus according to the first aspect further comprises a hollow cylindrical elastic member interposed between an inner peripheral surface of the tilting-restricting hole in the tilting-restricting member and an outer peripheral surface of the tilting-restricting shaft.

In accordance with a third aspect of the present invention, in the elastic shaft coupling apparatus according to the first aspect, the tilting-restricting member and the collar members are integrally formed of a synthetic resin.

In accordance with a fourth aspect of the present invention, the elastic shaft coupling apparatus according to the first aspect further comprises a projecting tubular portion formed in such a manner as to project from a peripheral edge of the tilting-restricting hole of the tilting-restricting member and is accommodated in a recess formed in an end face portion of one of the input-side member and the output-side member.

In accordance with a fifth aspect of the present invention, in the elastic shaft coupling apparatus according to the first aspect, the tilting-restricting shaft accommodated in the tilting-restricting hole of the tilting-restricting member has a distal end portion received in a receiving hole having a diameter larger than that of the tilting-restricting hole and formed in an end face portion of one of the input-side member and the output-side member.

In accordance with a sixth aspect of the present invention, the elastic shaft coupling apparatus according to the first aspect further comprises a facing plate-shaped elastic member interposed between an end face of the tilting-restricting member and one of the input-side member and the output-side member opposing that end face.

The above and other objects, features and advantages of the present invention will become more apparent from the following detailed description of the invention when read in conjunction with the accompanying drawings.

BRIEF DESCRIPTION OF THE DRAWINGS

FIG. 1 is a side elevational view of an elastic shaft coupling apparatus in accordance with an embodiment of the present invention;

FIG. 3 is an exploded perspective view of the essential portions in accordance with the present invention;

FIG. 12A is an exploded perspective view of the essential portions of the elastic shaft coupling apparatus in accordance with a further embodiment of the present invent on;

FIG. 12B is a vertical side cross-sectional view of the tilting-restricting member and its associated parts shown in FIG. 12A;

FIG. 12C is a vertical side cross-sectional view of a collar member and its associated parts shown in FIG. 12A;

DESCRIPTION OF THE PREFERRED EMBODIMENTS

Referring now to the accompanying drawings, a description will be given of the embodiments of the present invention.

Figure 2A:
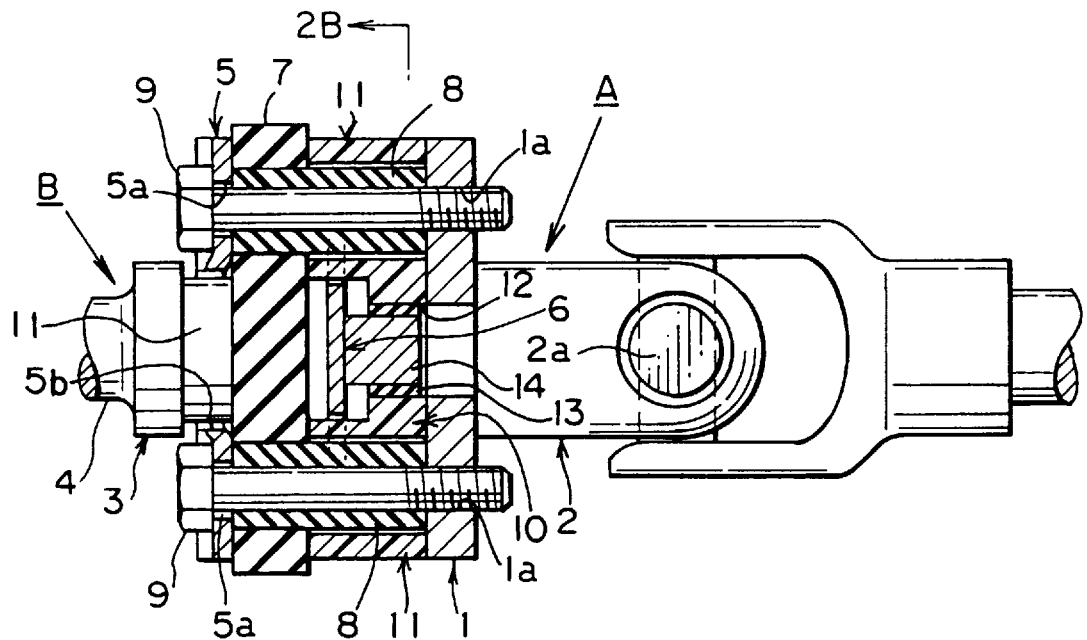
FIG. 2A is a vertical side cross-sectional view of essential portions of the elastic shaft coupling apparatus in accordance with the present invention.

As shown in FIGS. 1 and 2A, the elastic shaft coupling apparatus in accordance with the present invention has a coupling structure in which an input-side member A and an output-side member B are coupled together via an elastic plate member 7 transmits a rotating force from the input-side member A to the output-side member B while allowing for elastic movement of the members in the axial direction. As specific examples of the input-side member A and the output-side member B, it is possible to use shaft members which are formed as flange shaft members having flanges at their shaft ends, or shaft members formed as yoke members, or a combination thereof. Where flange shaft and yoke members are used in combination, a flange portion, which opposes a flange portion of the flange shaft member, is integrally formed from a plate member at an end face of the yoke member by press working.

A forked portion 2 comprising two opposing arm portions is formed integrally on a flange portion 1 of the input-side member A, while a pair of cross-shaft bearing holes 2a are respectively formed in the arm portions of the forked portion 2 (see FIGS. 1 and 2A). A pair of input-side coupling through holes 1a are formed in the flange portion 1. The output-side member B has a flange portion 3 and an output shaft portion 4 which are formed integrally in the axial direction (see FIG. 1). A pair of output-side coupling through holes 3a are formed in the flange portion 3 in bilaterally symmetrical relationship about the center of the flange portion 3.

As shown in FIG. 3, an input-side stopper plate 5 has a substantially disk-shaped configuration, and a pair of fixing through holes 5a which are formed bilaterally symmetrically about the center of the input-side stopper plate. The fixing through holes Sa are for coupling the input-side stopper plate 5 to the input-side member A. Further, the input-side stopper plate 5 has a pair of passing-through portions 5b arranged in a direction perpendicular to a line connecting the fixing through holes 5a. Each of the passing-through portions 5b has a notched shape in which an outer peripheral portion of the input-side stopper plate 5 is cut off in a substantially C-shaped configuration.

Similarly, an output-side stopper plate 6 includes a substantially disk-shaped configuration in the same way as the input-side stopper plate 5, and has a pair of fixing through holes 6a for coupling the output-side stopper plate 6 to the output-side member B. The pair of fixing through holes 6a are formed bilaterally symmetrically about the center of the output-side stopper plate 6. Further, the output-side stopper plate 6 has a pair of passing-through portions 6b arranged in a direction perpendicular to a line connecting the fixing through holes 6a. The fixing through holes 6a and the passing-through portions 6b have shapes substantially similar to those of the fixing through holes 5a and the passing-through portions 5b of the input-side stopper plate 5, respectively (see FIG. 3).

The elastic plate member 7 is disk shaped and formed of an elastic material such as rubber. The elastic plate member 7 is clamped between the input-side stopper plate 5 and the output-side stopper plate 6. Specifically, the input-side stopper plate 5 abuts against one side surface of the elastic plate member 7, and is secured to the input-side flange portion 1 through the use of tubular members 8, collar members 11, and shaft-shaped fixing means 9 such as bolts (see FIGS. 1 and 2A). The tubular members 8 are arranged on an appropriate circumference in the vicinities of the outer periphery of the elastic plate member 7 at equal intervals in such a manner as to be inserted in and project from the elastic plate member 7. Projecting portions of the tubular members 8 are respectively inserted in hollow portions 11a of the collar members 11 (see FIGS. 2A, 2B, and 3).

Two of the tubular members 8 are each positioned between the fixing through hole 5a and the input-side coupling through hole 1a in the input-side member A. The input-side member A and the input-side stopper plate 5 are coupled together at an appropriate distance therebetween in a state in which two shaft-shaped fixing means 9 are respectively passed through the two tubular members 8. Similarly, the output-side member B and the output-side stopper plate 6 are also coupled together by two tubular members 8 and two shaft-shaped fixing means 9 at an appropriate distance therebetween in the same way as the input-side member A and the input-side stopper plate 5.

The two tubular members 8 and the two collar members 11 for coupling the input-side member A and the input-side stopper plate 5 are loosely inserted in the passing-through portions 6b in the output-side stopper plate 6. Also, the two tubular members 8 and the two collar members 11 for coupling the output-side member B and the output-side stopper plate 6 are loosely inserted in the passing-though portions 5b in the input-side stopper plate 5 (see FIGS. 2A, 2B, and 3).

Portions of tubular members 8 projecting from the elastic plate member 7 are covered with the collar members 11. Namely, the tubular members 8 are respectively inserted in the hollow portions 11a of the collar members 11. The spacing between the elastic plate member 7 and the input-side member A and the spacing between the elastic plate member 7 and the output-side member B are fixedly set by the collar members 11, respectively.

Figure 12:
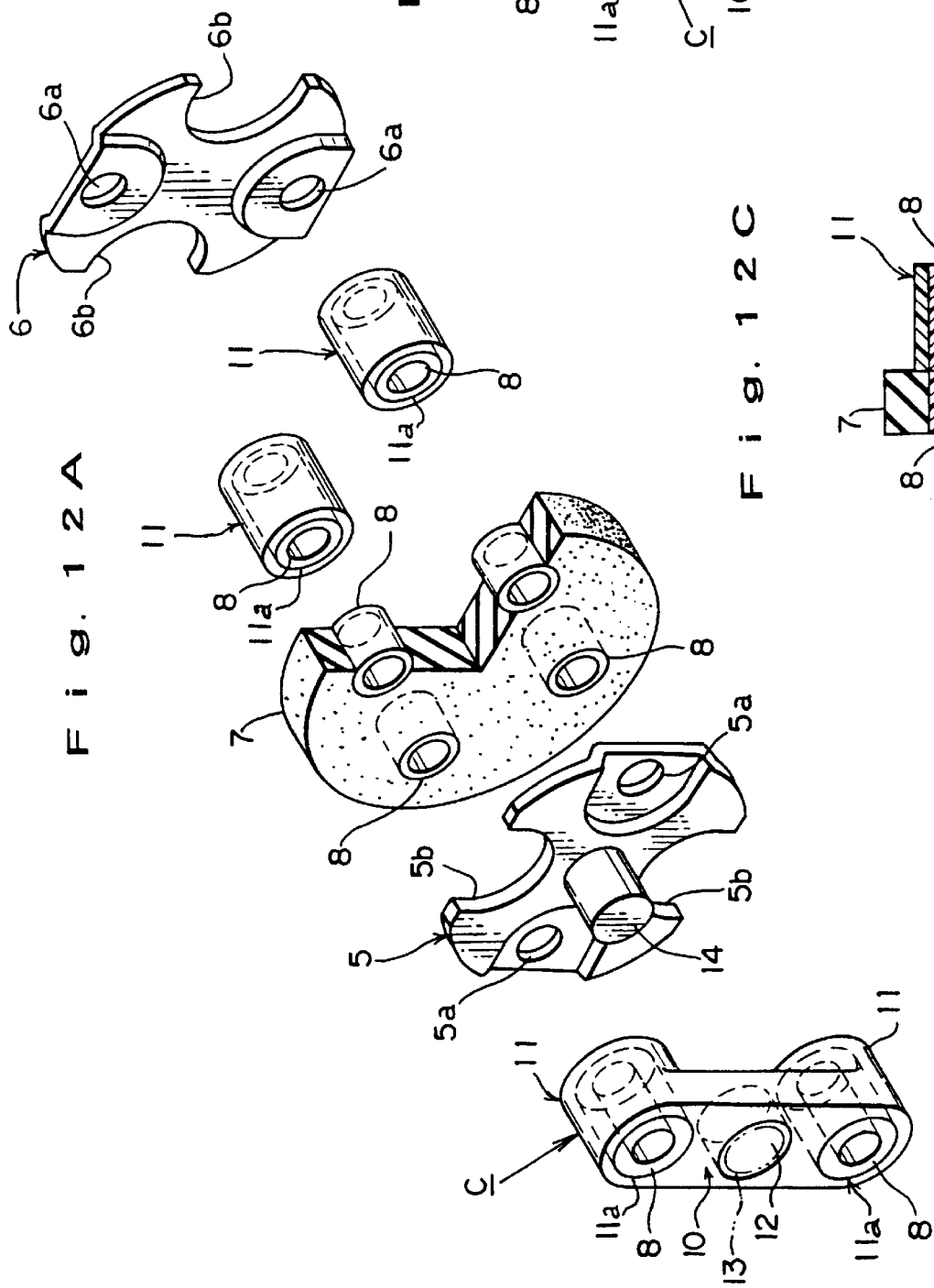

An arrangement may also be provided such that, as shown in FIGS. 12A to 12C, tubular members 8 each having the same axial length as the thickness of the elastic plate member 7 are inserted in the elastic plate member 7 to form one subassembly, and separate tubular members 8 each having the same axial length as that of the collar member 11 are inserted in the hollow portions 11a of the collar members 11 to form subassemblies on both sides of the elastic plate member 7. These subassemblies are combined in use so as to couple the input-side member A and the input-side stopper plate 5 as well as the output-side member B and the output-side stopper plate 6 while appropriately setting their spacing, respectively.

It should be noted that a metallic material may be used as the material of the tubular members 8, and a nonmetallic material such as a synthetic resin or a hard rubber material may be used as the material of the collar members 11. Appropriate clearances are provided between the collar member 11 and the tubular member 8 and/or between the tubular member 8 and the shaft-shaped fixing means 9.

Figure 15A:
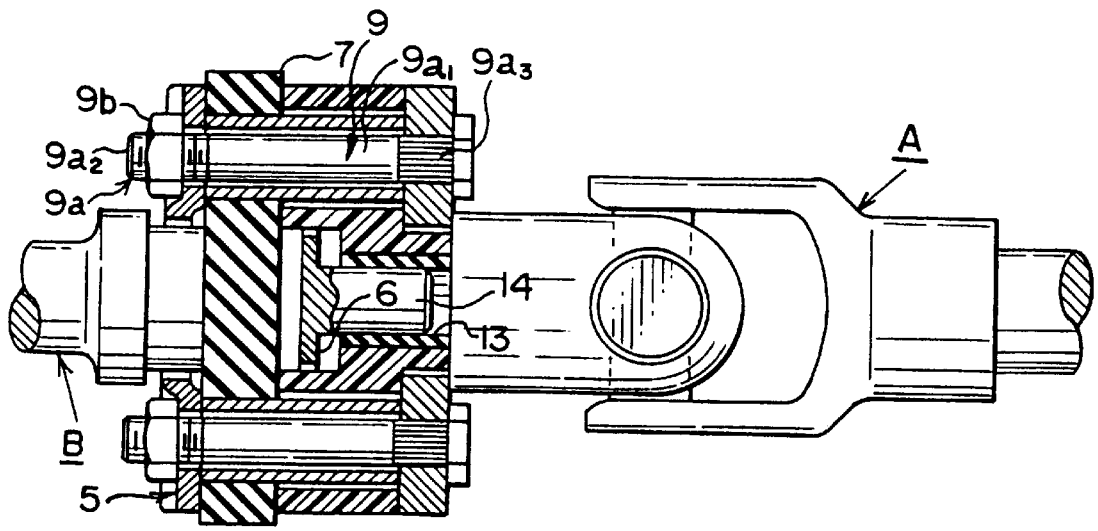
FIG. 15A is a fragmentary side view of the elastic shaft coupling apparatus in accordance with a further embodiment of the present invention.

As shown in FIG. 15A, each of the shaft-shaped fixing means 9 in a first example is comprised of a combination of a bolt 9a and a nut 9b. The bolt 9a has an unthreaded shank portion $9a_1$ and a threaded portion $9a_2$ formed at a tip of the shank portion $9a_1$. A knurled surface $9a_3$ is formed in a portion of the shank portion $9a_1$ in the vicinity of the bolt head. The diameter of the shank is set such that the shank portion $9a_1$ of the bolt 9a can be inserted into each input-side coupling through hole 1a and each output-side coupling through hole 3a by pressure-fitting means.

As the shank portions $9a_1$ of the bolts 9a are inserted into the input-side coupling through holes 1a and the output-side coupling through holes 3a in a pressure-fitted state, it is possible to improve the accuracy in assembling both the input-side member A and the input-side stopper plate 5 and the output-side member B and the output-side stopper plate 6.

Figure 15B:
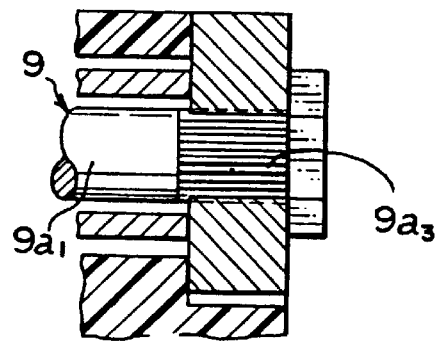
FIG. 15B is an enlarged cross-sectional view of essential portions shown in FIG. 15A.
Figure 15C:
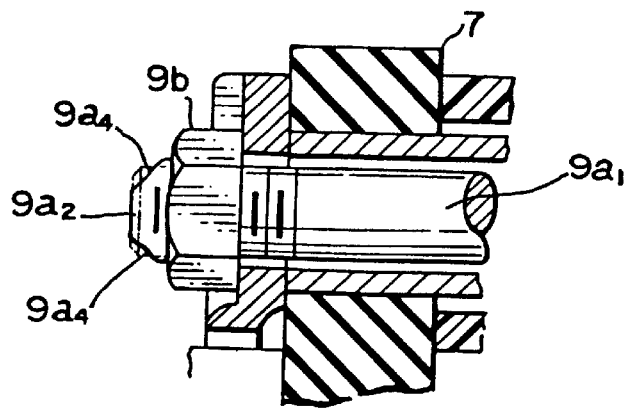
FIG. 15C is an enlarged cross-sectional view of other essential portions shown in FIG. 15B.
Figure 16:
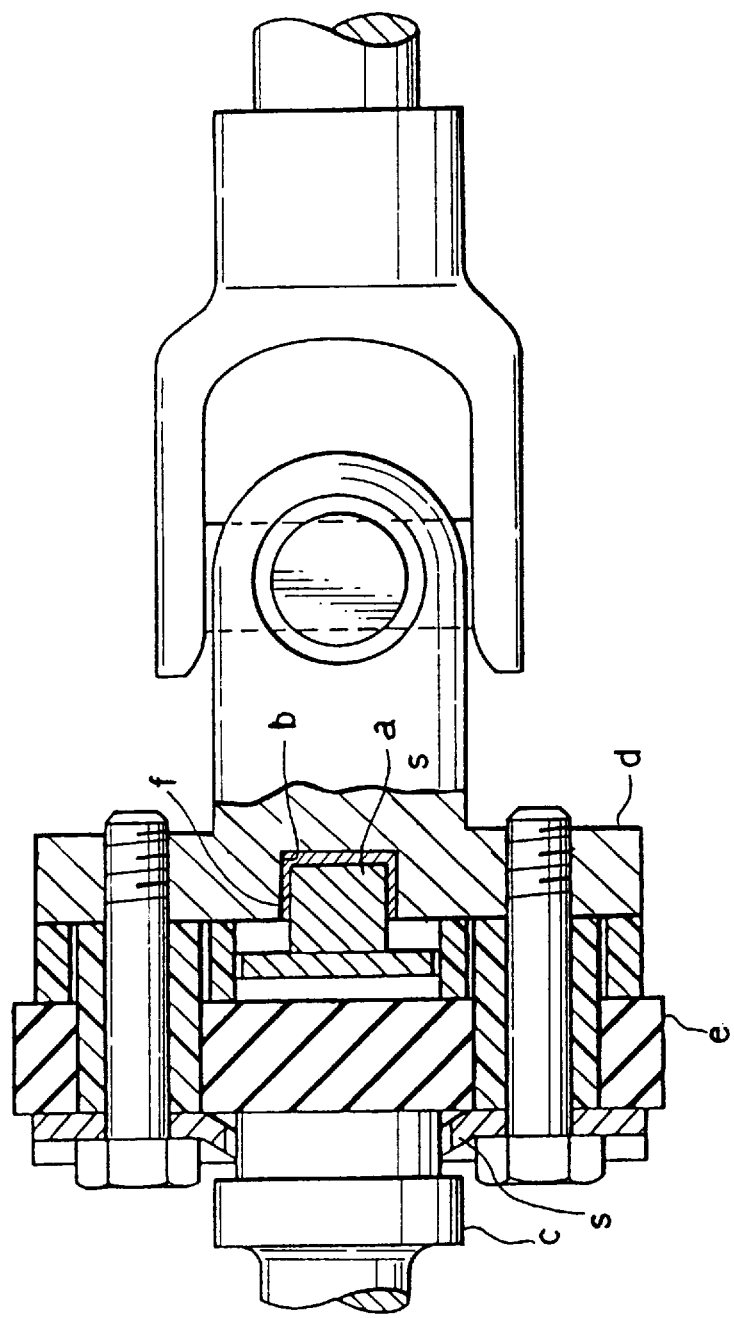
FIG. 16 is a vertical side cross-sectional view illustrating the elastic shaft coupling apparatus in accordance with the conventional art.

Further, as shown in FIG. 15B, the knurled surface $9a_3$ enhances the pressure-fitted state with respect to the input-side coupling through hole 1a and the output-side coupling through hole 3a to prevent idle rotation of the shank portion $9a_1$ and make the operation of tightening the nut 9b easier and more efficient. Nut 9b is preferably but not necessarily a self-locking nut, i.e., a nut having a mechanism for preventing loosening of the tightened nut.

By using the self-locking nut as the nut 9b, it is possible to prevent the nut 9b from coming off the bolt 9a, with the result that it is possible to make securer the coupling between the input-side member A and the input-side stopper plate 5 and the coupling between the output-side member B and the output-side stopper plate 6.

Further, after the nut 9b is tightened onto the bolt 9a, it is preferable to form a deformed portion $9a_4$ at an end face of the threaded portion $9a_2$ of the bolt 9a by means of caulking, but the deformed portion $9a_4$ may not necessarily be formed. In the event that loosening of nut 9b occurs, the nut can be prevented from coming off if the deformed portion $9a_4$ is formed by caulking.

In a second example, each of the shaft-shaped fixing means 9 is comprised of the bolt 9a alone. Internal threads are formed in an inner peripheral surface of the input-side coupling through hole 1a of the flange portion 1 and in an inner peripheral surface of the output-side coupling through hole 3a of the flange portion 3, and the shaft-shaped fixing means 9 formed by the above bolts threadedly engages with the internally threaded holes (see FIGS. 1, 2A, and 11).

In the above-described arrangement, the input-side stopper plate 5 is interposed between the output-side member B and the output-side stopper plate 6, while the output-side stopper plate 6 is interposed between the input-side member A and the input-side stopper plate 5. Further, the elastic plate member 7 is interposed between the input-side stopper plate 5 and the output-side stopper plate 6 (see FIG. 2A).

The input-side member A and the output-side member B are elastically coupled to each other via the elastic plate member 7. When the rotating force is transmitted from the input-side member A to the output-side member B, if there is some resistance in the output-side member B, the elastic plate member 7 is elastically twisted in the rotating direction, and causes an offset in the angle of rotation, thereby preventing an excessive load from being applied to the input-side member A and the output-side member B. Similarly, when the input-side member A and the output-side member B undergo a change in the tilting angle in the axial direction, the elastic plate member 7 is elastically deflected, thereby preventing an excessive load from being applied to the input-side member A and the output-side member B.

The elastic plate member 7 itself has a restoring force and, when relieved of its load after being twisted in the rotating direction or undergoing deflection, is capable of restoring its original shape. In addition, the collar members 11 rotatively move appropriately inside the passing-through portions 5b and 6b of the input- and output-side stopper plates 5 and 6. As a result, the collar members 11 abut against side surfaces of the passing-through portions 5b or 6b, preventing the elastic plate member 7 from being twisted further in the rotating direction.

As shown in FIGS. 1 to 3, a tilting-restriction member C may be comprised of a connecting portion 10 and the two collar members 11, all of which are formed integrally. The structure of each collar member 11 is such that the tubular member 8 is inserted in the hollow portion 11a of the collar member, as described above. These collar members 11 serve to set the respective spacings between the elastic plate member 7 and the input-side member A and between the elastic plate member 7 and the output-side member B. Additionally, the collar members 11 constitute abutment portions (at their peripheral portions) with the inner peripheral surfaces of the passing-through portions 5b and 6b of the input and output-side stopper plate 5 and 6. A tilting-restriction hole 12 is formed in a center of the connecting portion 10.

If the tilting-restriction member C is formed of a nonmetallic material such as a synthetic resin or a hard rubber material, it is possible to reduce the striking sound occurring when the input-side member A and the output-side member B undergo relative rotation through the torsional deflection of the elastic plate member 7, and the collar members 11 formed of the nonmetallic material are brought into contact with the inner peripheral surfaces of the respective passing-through portions 5b and 6b formed in the input- and output-side stopper plates 5 and 6.

Further, a tilting-restricting shaft 14 is provided on either the input-side stopper plate 5 or the output-side stopper plate 6. Specifically, the tilting-restriction shaft 14 has the shape of a pin shaft and is formed at a center of a side of the input-side stopper plate 5 or the output-side stopper plate 6. The tilting-restriction shaft 14 is adapted to be inserted and accommodated in the tilting-restriction hole 12. In the example shown in FIGS. 1, 2A, and 2B, the tilting-restriction shaft 14 is formed at the center of a side of the output-side stopper plate 6. In the example shown in FIG. 3, the tilting-restriction shaft 14 is formed at the center of a side of the input-side stopper plate 5.

The tilting-restriction shaft 14 is fixedly secured at the center of the side of the input-side stopper plate 5 or the output-side stopper plate 6 with welding means. Alternatively, the tilting-restriction shaft 14 may be formed integrally at the center of the side of the input-side stopper plate 5 or the output-side stopper plate 6 when the stopper plate 5 or 6 is press worked with metal plate as the material.

If the tilting-restriction member C is formed of the nonmetallic material such as a synthetic resin or a hard rubber material, the tilting-restriction shaft 14 is directly inserted and accommodated in the tilting-restriction hole 12 to provide a mechanism for preventing the tilting of the input-side member A and the output-side member B with respect to the axial direction. In addition, the tilting-restriction shaft 14 serves to prevent the input-side stopper plate 5 and the output-side stopper plate 6 from coming into contact with their opposing collar members 11 and tubular members 8 due to the tilting of the input-side member A and the output-side member B with respect to the axial direction. Further, since no metallic contact takes place between the input- and output-side members A and B, it is possible to suppress the transmission of vibrations from the output-side member B (e.g., the steering gear side) to the input-side member A (e.g., the steering column side).

Figure 2B:
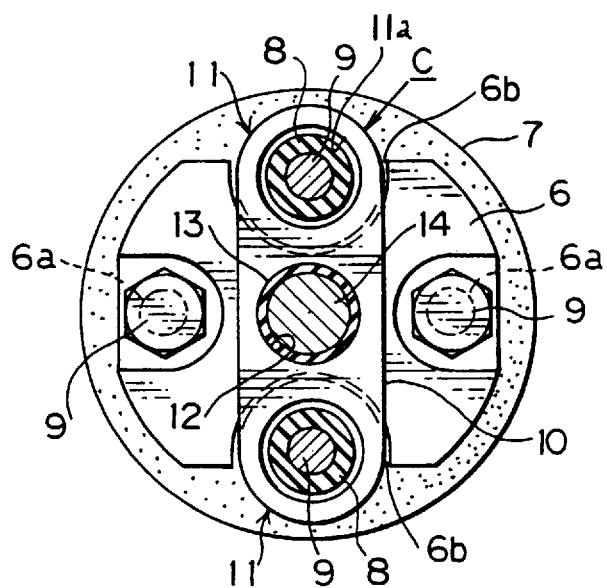
FIG. 2B is a cross-sectional view taken along in the direction of arrows along line P—P in FIG. 2A.
Figure 5A:
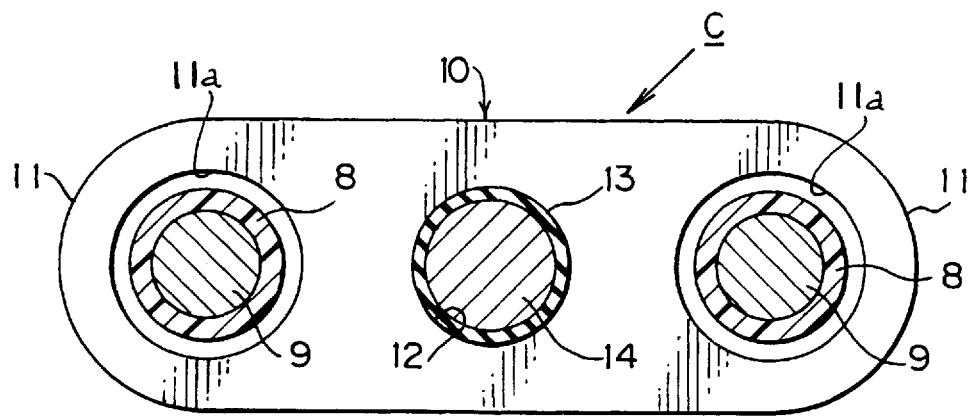
FIG. 5A is a schematic diagram illustrating the positional relationships among the tilting-restricting shaft, tubular members, and shaft-shaped fixing means which are fitted in a tilting-restricting member in a state in which the axes of the input-side member and the output-side member are aligned with each other.

As a second type of tilting-restriction member C, as shown in FIGS. 2A, 2B, and 5A, the tilting-restriction member is provided with an elastic member 13 which is formed of an elastic rubber material or elastic synthetic resin provided between an inner periphery of the tilting-restriction hole 12 and an outer periphery of the tilting-restriction shaft 14. Specifically, the elastic member 13 has a hollow cylindrical shape which is pre-fitted into the tilting-restriction hole 12. The elastic member 13 suppresses the transmission of vibrations from the output-side member B to the input-side member A. Incidentally, in the tilting-restriction member C, if the connecting portion 10 and the collar members 11 are formed separately, and the connecting portion 10 is formed of a metallic material, the transmission of the vibrations can be similarly suppressed by providing the elastic member 13 between the inner periphery of the tilting-restriction hole 12 and the outer periphery of the tilting-restriction shaft 14.

Figure 10A:
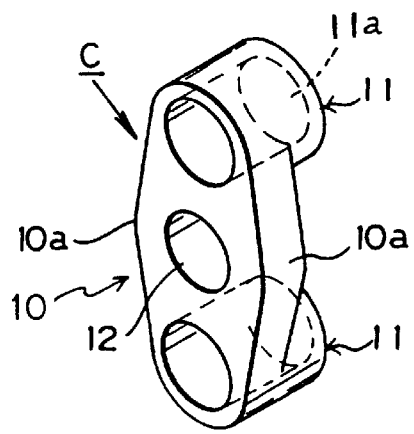
FIG. 10A is a perspective view of still another modification of the tilting-restricting member.
Figure 10B:
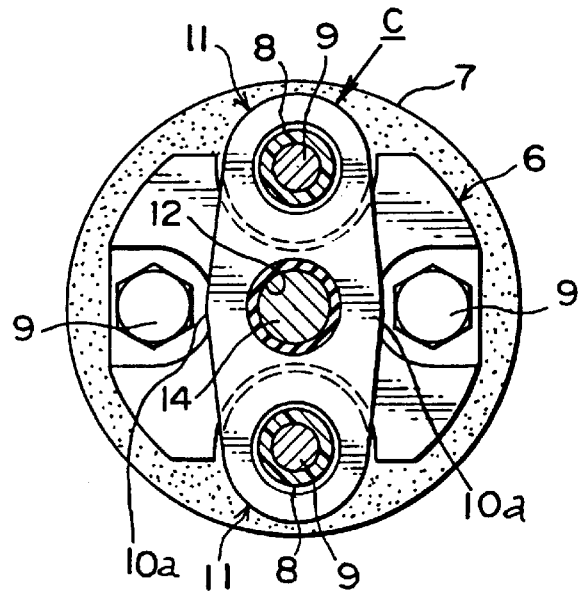
FIG. 10B is a vertical front cross-sectional view of the essential portions in which the tilting-restricting member shown in FIG. 10A is used.

As a third type of tilting-restriction member C, as shown in FIG. 10A, the tilting-restriction member is provided with a pair of enlarged width portions 10a which are provided on both sides of the longitudinally central portion of the connecting portion 10, i.e., on both sides of the tilting-restriction hole 12. The enlarged width portions 10a make it possible to increase the area of that portion of the connecting portion 10 which surrounds the tilting-restriction hole 12, and increases areas of portions surrounding the two collar members 11. The enlarged width portions 10a allow the tilting-restriction member C to abut against the input-side member A or the output-side member B with a greater area due to its shape to more reliably prevent tilting of the tilting-restriction shaft 14 (See FIG. 10B).

Figure 7A:
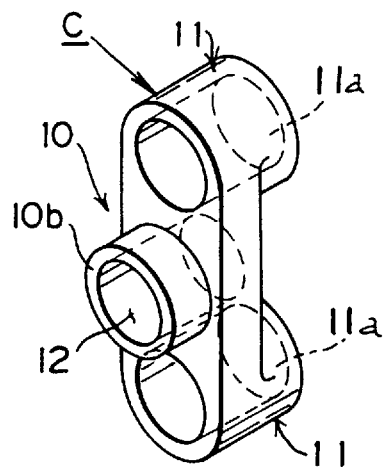
FIG. 7A is a perspective view of a modification of the tilting-restricting member.
Figure 7B:
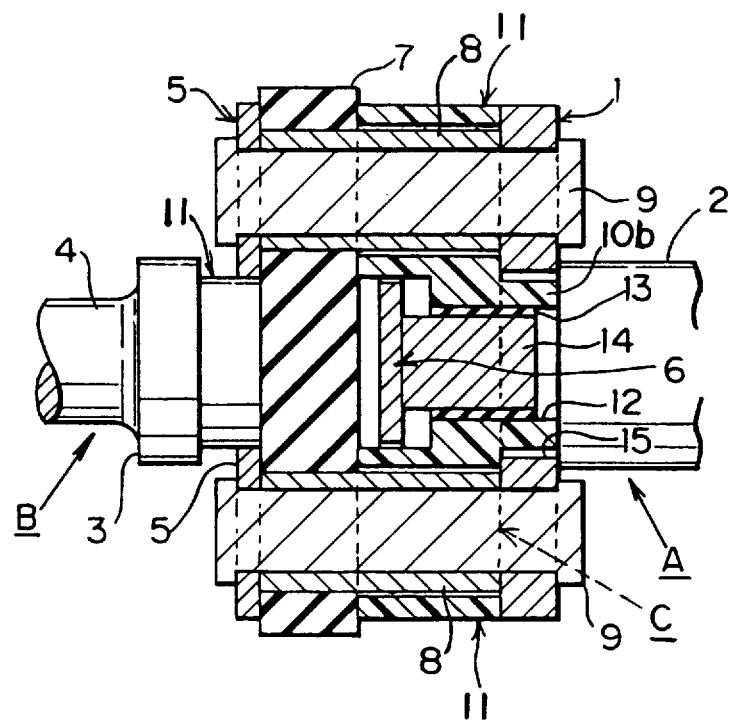
FIG. 7B is a vertical side cross-sectional view of the essential portions in which the tilting-restricting member shown in FIG. 7A is used.

As a fourth type of the tilting-restriction member C, as shown in FIG. 7A, the tilting-restriction member C includes a projecting tubular portion 10b which is projects from a peripheral edge of the tilting-restriction hole 12 in the connecting portion 10. In the tilting-restriction member C of this fourth type, as shown in FIG. 7B, the projecting tubular portion 10b is loosely inserted in a recess 15 formed in an axially central portion of the flange portion 1 of the input-side member A or the flange portion 3 of the output-side member B so as to be slidable inside the recess 15. With this projecting tubular portion 10b, the axial length of the tilting-restriction hole 12 can be enlarged, and the wall thickness of the outer peripheral portion of the tilting-restriction hole can be enlarged, thereby making it possible to increase the strength of the tilting-restriction member.

For this reason, it is possible to obtain a large contact surface along the axial direction between the inner peripheral surface of the tilting-restriction hole 12 and the outer periphery of the tilting-restriction shaft 14 provided on either the input-side stopper plate 5 or the output-side stopper plate 6. Consequently, the tilting-restriction shaft 14 can be reliably held in the tilting-restriction hole 12, and the tilting of the input-side member A and the output-side member B with respect to the axial direction can be prevented.

Figure 8A:
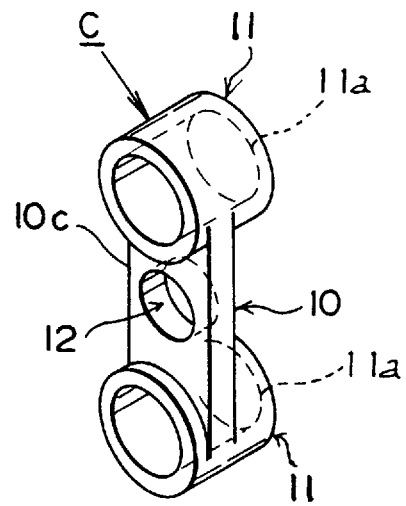
FIG. 8A is a perspective view of another modification of the tilting-restricting member.

As a fifth type of tilting-restriction member C, as shown in FIG. 8A, the tilting-restriction member includes an escape portion 10c which is formed around the tilting-restriction hole 12 as a recessed flat portion between axial ends of the two collar members 11 in the connecting portion 10 facing the end face of either the input-side member A or the output-side member B. The tilting-restriction member C is clamped between the elastic plate member 7 and the end face of either the input-side member A or the output-side member B to cause the tightening force exerted by the shaft-shaped fixing means 9 to be applied only to the collar members 11 (see FIG. 8B).

For this reason, even if the recessed flat surface of the connecting portion 10 of the tilting-restriction member C and the end face of the input-side member A or the output-side member B have surface irregularities, only the collar members 11 come into contact with the end face of the input-side member A or the output-side member B, and the connecting portion 10 does not abut against such an irregular surface. Hence, it is possible to prevent the deformation of the inner peripheral surface of the tilting-restriction hole 12 in the tilting-restriction member C, and it is possible to avoid an external force which may be otherwise applied to the inner peripheral surface of the tilting-restriction hole during assembly.

Figure 8B:
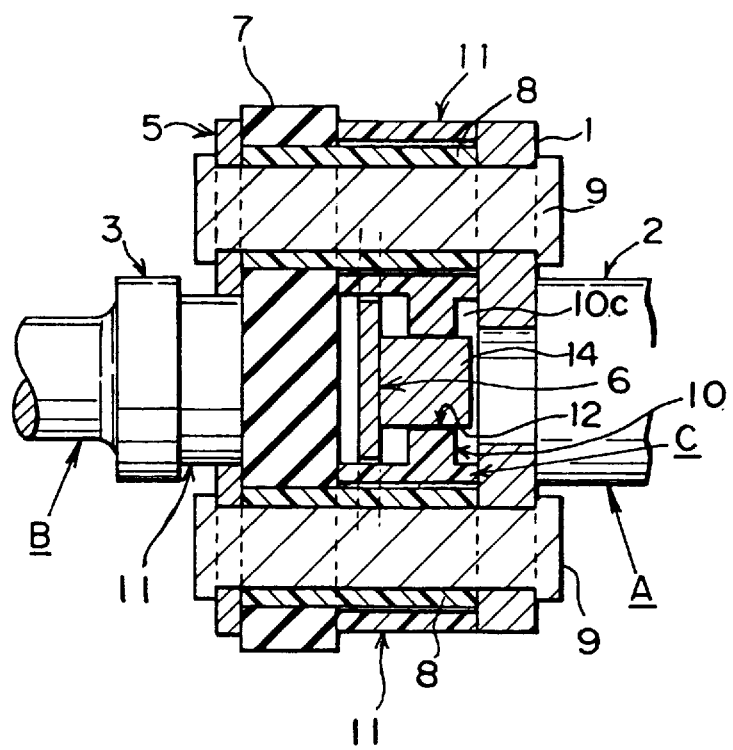
FIG. 8B is a vertical side cross-sectional view of the essential portions in which the tilting-restricting member shown in FIG. 8A is used.

The end face of the input-side member A or the output-side member B opposing the tilting-restriction hole 12 is formed as a flat surface and the recessed escape portion 10c which is larger than the tilting-restriction hole 12 is formed (see FIG. 8B). On the other hand, if the flat portion of the tilting-restriction member C which faces the end face of the input-side member A or the output-side member B is not provided with the recessed escape portion 10c, a hole larger than the tilting-restriction hole 12 may be formed in an end face portion of the input-side member A or the output-side member B.

Figure 9:
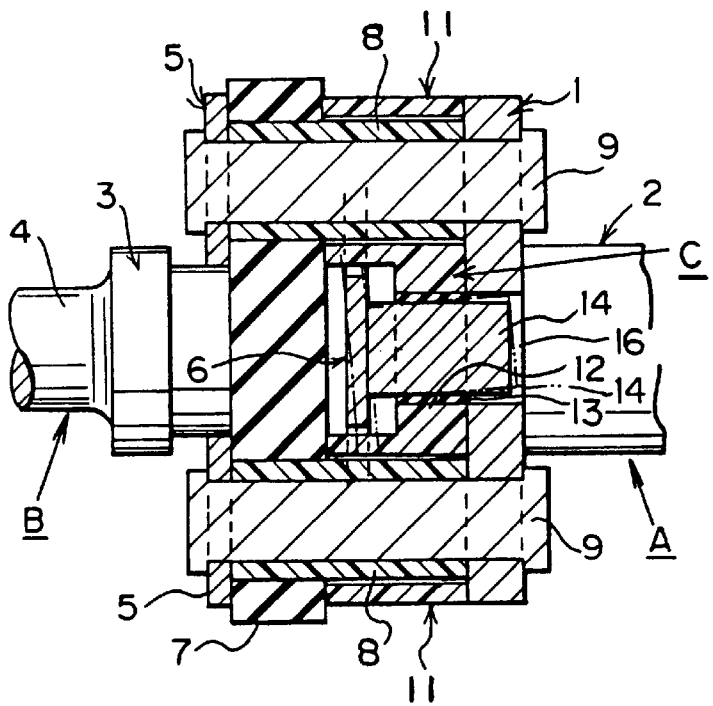
FIG. 9 is a vertical side cross-sectional view of essential portions of the elastic shaft coupling apparatus in accordance with another embodiment of the present invention.

As shown in FIG. 9, a receiving hole 16 having a diameter larger than that of the tilting-restriction hole 12 is formed in the end face portion of the input-side member A or the output-side member B. The arrangement provided is such that the tilting-restriction shaft 14 formed on either the input-side stopper plate 5 or the output-side stopper plate 6 is inserted through the tilting-restriction hole 12 of the tilting-restriction member C, and a distal end portion of the tilting-restriction shaft 14 is received in the receiving hole 16. Thus, tilting of the input-side member A and the output-side member B with respect to the axial direction is first prevented by the inner peripheral surface of the tilting-restriction hole 12.

Then, if an excessive bending load is applied to the tilting-restriction shaft 14, the inner peripheral surface of the tilting-restriction hole 12 or the rubber elastic member 13 provided on its inner periphery can be deformed by the tilting-restriction shaft 14, so that the tilting-restriction shaft 14 tends to be substantially inclined inside the tilting-restriction hole 12. Such a state can be prevented by the stopper mechanism wherein the inner peripheral surface of the receiving hole 16 formed in the input-side member A or the output-side member B and the outer peripheral surface of the distal end portion of the tilting-restriction shaft 14 abut against each other.

Figure 14A:
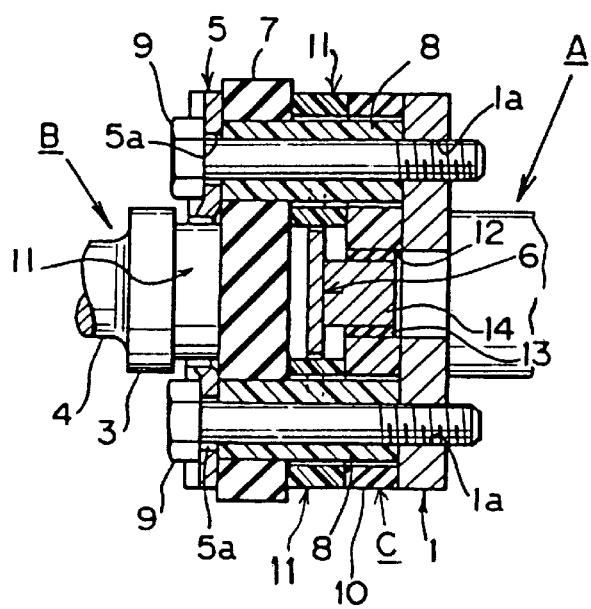
FIG. 14A is a vertical side cross-sectional view of the essential portions in which a tilting-restricting member having separately formed collar members is used.
Figure 14B:
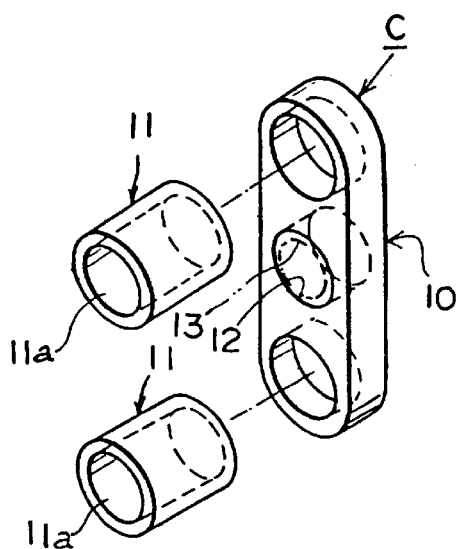
FIG. 14B is a perspective view of the tilting-restricting member having the separately formed collar members.

Further, as a sixth type of tilting-restriction member C, as shown in FIGS. 14A and 14B, the connecting portion 10 and the collar members 11 are formed separately by using different materials, the connecting portion 10 being formed of a metallic material and the collar members 11 being formed of a resin material.

Figure 11:
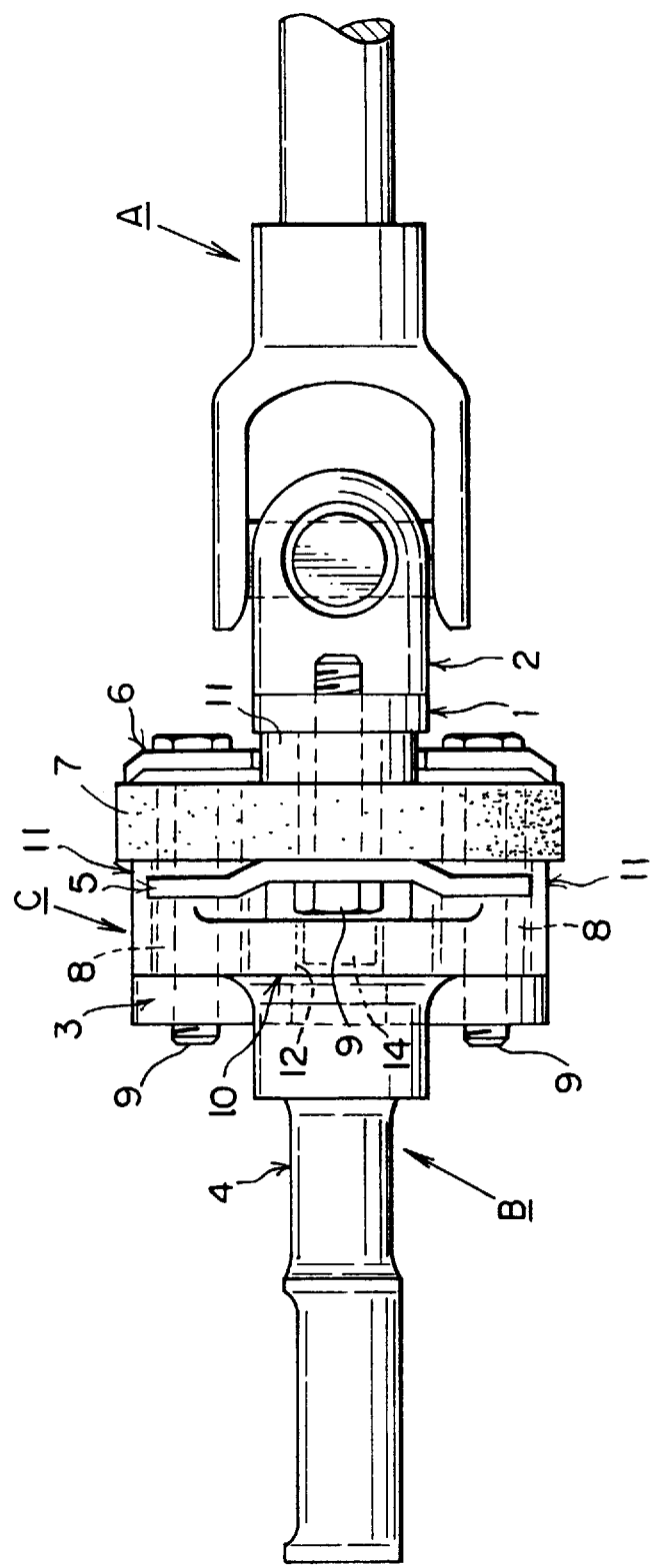
FIG. 11 is a side elevational view of the elastic shaft coupling apparatus in accordance with still another embodiment of the present invention.

Although in the above-described embodiments the tilting-restriction member C is interposed between the input-side member A and the elastic plate member 7, an arrangement may be provided such that the tilting-restriction member C is interposed between the output-side member B and the elastic plate member 7, as shown in FIG. 11.

Figure 13:
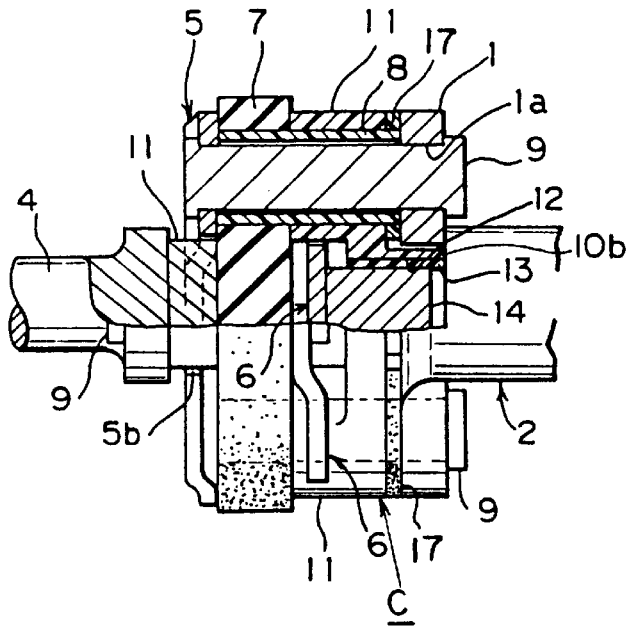
FIG. 13 is a side view, partly in section, of the essential portions of the elastic shaft coupling apparatus in accordance with a still further embodiment of the present invention.

In still another embodiment, as shown in FIG. 13, a pair of annular elastic members 17 each formed in the shape of a facing plate are interposed between the end face of the tilting-restriction member C and the input-side member A or the output-side member B opposing that end face. Specifically, the annular elastic members 17 are disposed over the respective tubular members 8 to improve the capability of dampening vibrations in the transmission of vibrations between the output-side member B and the input-side member A.

To sum up the basic arrangement of the above-described elastic shaft coupling apparatus in accordance with the present invention, the elastic shaft coupling apparatus comprises input-side stopper plate 5; output-side stopper plate 6; elastic plate member 7 clamped by the input-side stopper plate 5 and the output-side stopper plate 6; tubular members 8; collar members 11 into which the tubular members 8 are respectively inserted with clearances; input-side member A secured to the input-side stopper plate 5 at an appropriate interval therewith via the tubular members 8 and the collar members 11; the output-side member B secured to the output-side stopper plate 6 at an appropriate interval therewith via the tubular members 8 and the collar members 11, and elastically coupled to the input-side member A in an axial direction and in a circumferential direction; tilting-restriction shaft 14 formed on one of the input-side stopper plate 5 and the output-side stopper plate 6; and tilting-restriction member C fixed between the elastic plate member 7 and one of the input-side member A and the output-side member B, and having the tilting-restriction hole 12 for accommodating the tilting-restriction shaft 14 therein. Accordingly, first of all, there is an advantage in that even if axes $L_A$ and $L_B$ of the input-side member A and the output-side member B are offset from each other (see FIG. 4), it is possible to constantly maintain the tilting-restriction member C and the tilting-restriction shaft 14 in proper states. Second, the structure can be simplified.

To give a detailed description of the above advantages, the present invention does not adopt the conventional structure in which the tilting-restriction shaft 14 provided on either the input-side stopper plate 5 or the output-side stopper plate 6 is inserted into the input-side member A or the output-side member B itself. Instead, the present invention adopts a structure in which the tilting-restriction shaft 14 provided on either the input-side stopper plate 5 or the output-side stopper plate 6 is accommodated in the tilting-restriction hole 12 of the tilting-restriction member C provided between the elastic plate member 7 and one of the input-side member A and the output-side member B. By making use of the clearances each provided between the collar member 11 and the tubular member 8 and/or between the tubular member 8 and the shaft-shaped fixing means 9, the tilting-restriction member C can be moved in a direction perpendicular to the axial direction independently of the input-side member A or the output-side member B.

Figure 4:
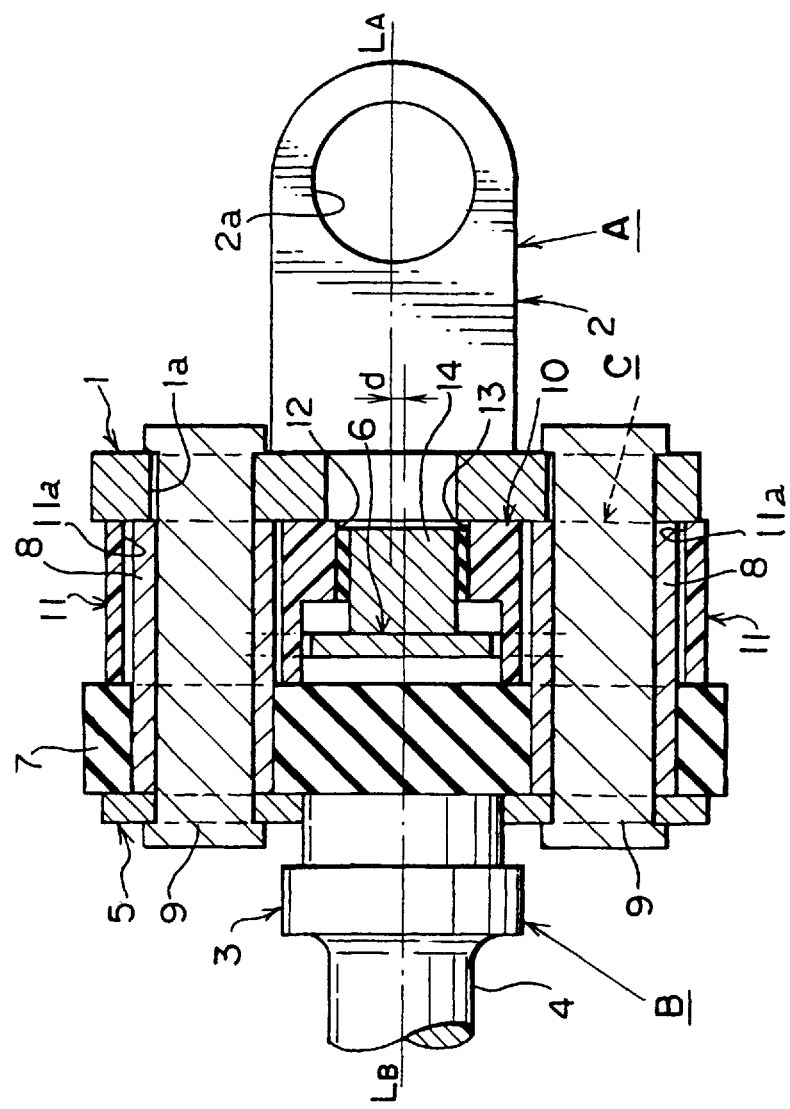
FIG. 4 is a vertical side cross-sectional view of the essential portions, and illustrates a state in which the axis of a tilting-restricting shaft and the center of a tilting-restricting hole are aligned even though the axes of an input-side member and an output-side member are not aligned with each other.

Therefore, as shown in FIG. 4, a situation is now assumed to have occurred in which the axis $L_A$ and the axis $L_B$ are offset from each other due to an error in assembly of the tilting-restriction shaft 14 of the stopper plate and the input-side member A or the output-side B, and that an offset with a gap of a dimension d has occurred therebetween, degrading the positional accuracy of the tilting-restriction shaft 14 of the stopper plate. Even in such a case, in accordance with the present invention, since the tilting-restriction member C is provided separately from the input-side member A and the output-side member B, the tilting-restriction member C can be moved in a direction perpendicular to the axial direction within the range of the clearance.

Figure 5B:
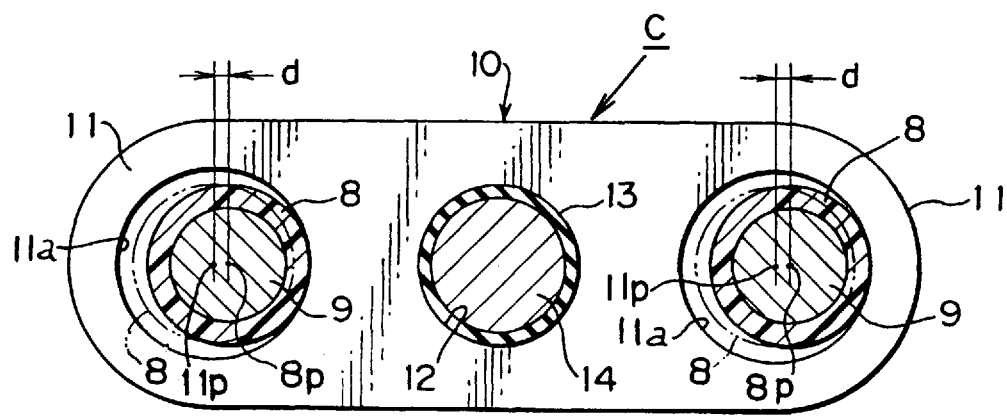
FIG. 5B is a schematic diagram illustrating the positional relationships among the tilting-restricting shaft, the tubular members, and the shaft-shaped fixing means which are fitted in the tilting-restricting member in a state in which the axes of the input-side member and the output-side member are not aligned with each other.
Figure 6A:
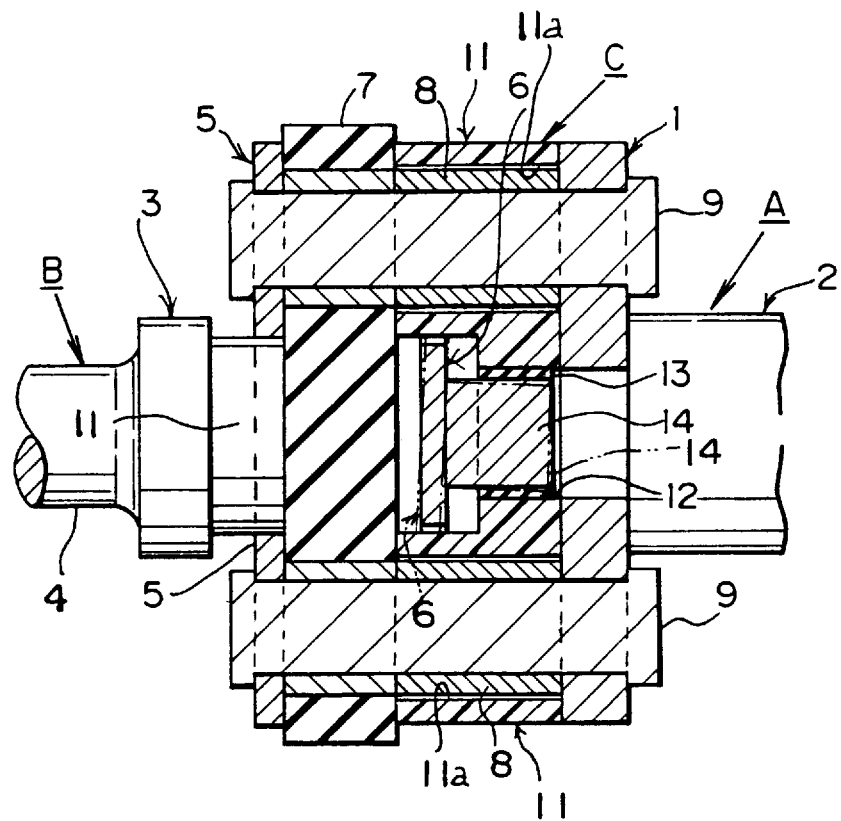
FIG. 6A is a vertical side cross-sectional view of the essential portions, and illustrates a state in which the tilting-restricting shaft is restored from its offset state with respect to the tilting-restricting hole.
Figure 6B:
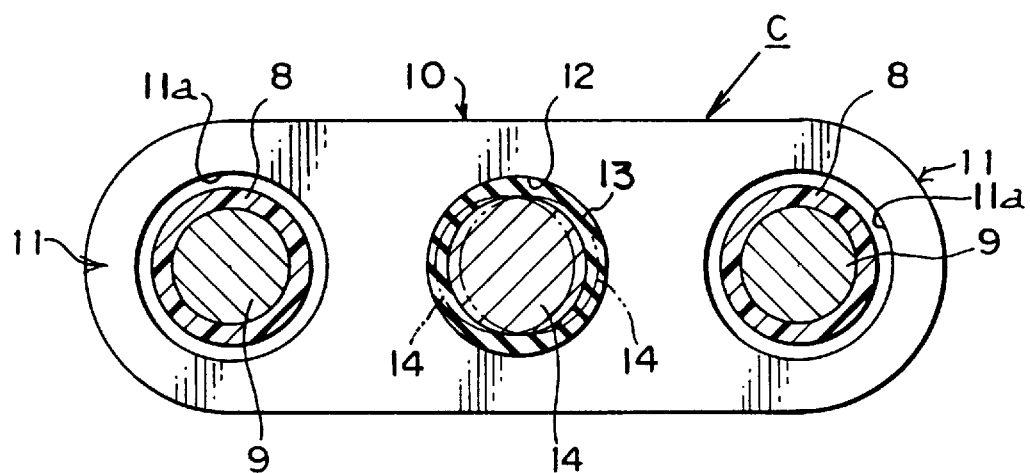
FIG. 6B is a schematic plan view of the tilting-restricting member, and illustrates the state in which the tilting-restricting shaft is restored from its offset state with respect to the tilting-restricting hole.

Namely, as shown in FIG. 5B, positional adjustment of the tilting-restriction shaft 14 in the tilting-restriction hole 12 becomes possible simply by moving the respective tubular members 8 by an amount of the dimension d such that the axial center $8p$ of each tubular member 8 becomes aligned with the axial center $11p$ of the hollow portion $11a$ of each collar member 11 in the tilting-restriction member C. Hence, within the allowable range of adjustment, the axis of the tilting-restriction shaft 14 can be aligned with the center of the tilting-restriction hole 12.

As a result, it is possible to overcome the state of uneven contact between the outer peripheral surface of the tilting-restriction shaft 14 and the inner peripheral surface of the tilting-restriction hole 12 to achieve smooth sliding of the tilting-restriction shaft 14 in the tilting-restriction hole 12 due to the axial deflection of the elastic plate member 7 serving as an elastic shaft coupling. Accordingly, it is possible to cause the vibrations-damping affect to be exhibited sufficiently with a predetermined spring constant without hampering the axial deflection of the elastic plate member 7, thereby making it possible to stabilize the performance of the apparatus.

In accordance with the present invention, since the positional adjustment of the tilting-restriction shaft 14 can be made through the adjustment of clearances between the collar member 11 and the tubular member 8 and/or between the tubular member 8 and the shaft-shaped fixing means 9 in the respective insertion hole, the tilting-restriction shaft 14 can be inserted and accommodated in the tilting-restriction hole 12 in a coaxial neutral state without enlarging the clearance between the outer peripheral surface of the tilting-restriction shaft 14 and the inner peripheral surface of the tilting-restriction hole 12 or without increasing parts processing accuracy and assembly accuracy. Therefore, the mechanism for preventing the tilting of the input-side member A and the output-side member B is able to sufficiently demonstrate its performance without increasing product cost.

Further, if, as described above, the elastic shaft coupling apparatus is arranged to further comprise the hollow cylindrical elastic member 13 interposed between the inner peripheral surface of the tilting-restriction hole 12 in the tilting-restriction member C and the outer peripheral surface of the tilting-restriction shaft 14, in addition to the aforementioned advantages, it is possible to expect a greater effect of the tilting-restriction shaft 14 in dampening vibrations by means of the elastic member 13. In addition, even if the tilting-restriction shaft 14 becomes tilted with respect to the axial direction of the tilting-restriction hole 12, the tilting-restriction shaft 14 is forcibly pushed back due to the restoring property of the elastic member 13 in such a way that the axial center of the tilting-restriction shaft 14 is aligned again with the axial center of the tilting-restriction hole 12. Hence, the performance of correcting the tilting of the tilting-restriction shaft 14 improves.

Further, if, as described above, in the elastic shaft coupling apparatus, the tilting-restriction member C and the collar members 11 are integrally formed of a synthetic resin, when the collar members 11 of the tilting-restriction member C and the like come into contact with the input-side stopper plate 5 or the output-side stopper plate 6, metallic contact can be avoided virtually completely to reduce the contact noise. In addition, since the two collar members 11 are integrally formed with the tilting-restriction member C, the number of component parts used can be substantially reduced, which in turn reduces the number of assembly steps, improves productivity, and lowers product cost.

If, as described above, the elastic shaft coupling apparatus is arranged to further comprise the projecting tubular portion 10b formed to project from a peripheral edge of the tilting-restriction hole 12 of the tilting-restriction member C and accommodated in the recess 15 formed in an end face portion of one of the input-side member A and the output-side member B, the axial length of the tilting-restriction hole 12 can be increased by the formation of the tubular portion 10b. Hence, the wall thickness of the outer peripheral portion of the tilting-restriction hole 12 can be enlarged, thereby making it possible to increase the strength of the tilting-restriction member C.

For this reason, it is possible to obtain a large contact area along the axial direction between the inner peripheral surface of the tilting-restriction hole 12 and the outer periphery of the tilting-restriction shaft 14 provided on either the input-side stopper plate 5 or the output-side stopper plate 6. Consequently, the tilting-restriction shaft 14 can be reliably held in the tilting-restriction hole 12, and the tilting of the input-side member A and the output-side member B with respect to the axial direction can be prevented.

Further, if, as described above, in the elastic shaft coupling apparatus, the tilting-restriction shaft 14 accommodated in the tilting-restriction hole 12 of the tilting-restriction member C has its distal end portion received in the receiving hole 16 having a diameter larger than that of the tilting-restriction hole 12 and formed in an end face portion of one of the input-side member A and the output-side member B, the inner peripheral surface of the receiving hole 16 serves as a stopper for restriction the tilting of the tilting-restriction shaft 14.

If an excessive bending load is applied to the tilting-restriction shaft 14 in the tilting-restriction hole 12, the tilting-restriction shaft 14 which is thereby tilted strongly abuts against the inner peripheral surface of the tilting-restriction hole 12, causing deformation of the inner peripheral surface of the tilting-restriction hole 12. Alternatively, the elastic member 13 which is provided in the tilting-restriction hole 12 may become substantially deformed.

In such a case, a large inclining force of the tilting-restriction shaft 14 inside the tilting-restriction hole 12 is received by the inner peripheral surface of the receiving hole 16 formed in the input-side member A or the output-side member B as the inner peripheral surface of the receiving hole 16 abuts against the outer peripheral surface of the distal end of the tilting-restriction shaft 14. Accordingly, it is possible to prevent the deformation of the inner peripheral surface of the tilting-restriction hole 12 and protect the elastic member 13.

Further, if, as described above, the elastic shaft coupling apparatus is arranged to further comprise the facing plate-shaped elastic member 17 interposed between an end face of the tilting-restriction member C and one of the input-side member A and the output-side member B opposing that end face, it is possible to improve the capability of dampening vibrations in the transmission of vibrations through the facing plate-shaped elastic member 17 interposed between contact surfaces of the tilting-restriction member C and the input-side member A or the output-side member B.

What is claimed is:

1. An elastic shaft coupling apparatus, comprising:
   an input-side stopper plate;
   an output-side stopper plate;
   an elastic plate member clamped by said input-side stopper plate and said output-side stopper plate;
   an input-side member secured to said input-side stopper plate with said elastic plate member and shaft-shaped fixing means;
   an output-side member secured to said output-side stopper plate with said elastic plate member and said shaft-shaped fixing means, and being elastically coupled to said input-side member in an axial direction and in a circumferential direction;
   collar members provided through said input-side stopper plate an a appropriate interval between said elastic plate member and said output-side member, said collar members contacting with said input-side stopper plate under a restoring force of said elastic plate member;
   additional collar members provided through said output-side stopper plate at an appropriate interval between said elastic plate member and said input-side member, and brought into contact with said output-side stopper plate depending on a restoring force of said elastic plate member;
   a tilting restriction shaft formed in the center of one of said input-side stopper plate and said output-side stopper plate;
   a tilting-restriction member fixed between said elastic plate member and one of said input-side member and said output-side member facing to one of said input-side stopper plate and said output-side stopper plate forming said tilting-restriction shaft, and having a tilting-restriction hole for inserting and tilting-restriction shaft therein; and
   a hollow cylindrical elastic member interposed between an inner peripheral surface of said tilting-restriction hole in said tilting-restriction member and an outer peripheral surface of said tilting-restriction shaft.

2. An elastic shaft coupling apparatus according to claim 1, further comprising:
   a projecting tubular portion formed to project from a peripheral edge of said tilting-restriction hole of said tilting-restriction member and loosely inserted into a recess formed in a flange portion of one of said input-side member and said output-side member.

3. An elastic shaft coupling apparatus according to claim 1, wherein said tilting-restriction shaft inserted into said tilting-restriction hole of said tilting-restriction member is located at a receiving hole having a diameter larger than that of said tilting-restriction hole and formed in a flange portion of of one of said input-side member and said output-side member; and wherein an abutment of said tilting-restriction shaft and said receiving hole defines a stopper structure.

4. An elastic shaft coupling apparatus comprising:
   an input-side stopper plate;
   an output-side stopper plate;
   an elastic plate member clamped by said input-side stopper plate and said output-side stopper plate;
   tubular members;
   collar members into which said tubular members are respectively inserted with clearances;
   an input-side member secured to said input-side stopper plate an appropriate interval therewith via said tubular members and said collar members;
   an output-side member secured to said output-side stopper plate at an appropriate interval therewith via said tubular members and said collar members, and elastically coupled to said input-side member in an axial direction and in a circumferential direction;
   a tilting-restriction shaft formed on one of said input-side stopper plate and said output-side stopper plate; and
   a tilting-restriction member fixed between said elastic plate member and one of said input-side member and said output-side member, and having a tilting-restriction hole for accommodating said tilting-restriction shaft therein;
   wherein said tilting-restriction member and said collar members are integrally formed of a synthetic resin.

5. An elastic shaft coupling apparatus, comprising:
   an input-side stopper plate;
   an output-side stopper plate;
   an elastic plate member clamped by said input-side stopper plate and said output-side stopper plate;
   an input-side member secured to said input-side stopper plate with said elastic plate member and shaft-shaped fixing means;

an output-side member secured to said output-side stopper plate with said elastic plate member and said shaft-shaped fixing means and being elastically coupled to said input-side member in an axial direction and in a circumferential direction;

collar members provided through said input-side stopper plate an a appropriate interval between said elastic plate member and said output-side member, and brought into contact with said input-side stopper plate depending on a restoring force of said elastic plate member;

additional collar members provided through said output-side stopper plate at an appropriate interval between said elastic plate member and said input-side member, said collar members contacting with said output-side stopper plate under a restoring force of said elastic plate member;

a tilting-restriction shaft formed in the center of one of said input-side stopper plate and said output-side stopper plate; and a tilting-restriction member fixed between said elastic plate member and one of said input-side member and said output-side member facing to one of said input-side stopper plate and said output-side stopper plate forming said tilting-restriction shaft, and having a tilting-restriction hole for accommodating said tilting-restriction shaft therein.

* * * * *